Nov. 7, 1944.    H. R. ELLINWOOD    2,362,124
CONDUIT SUPPORT
Filed Aug. 18, 1942
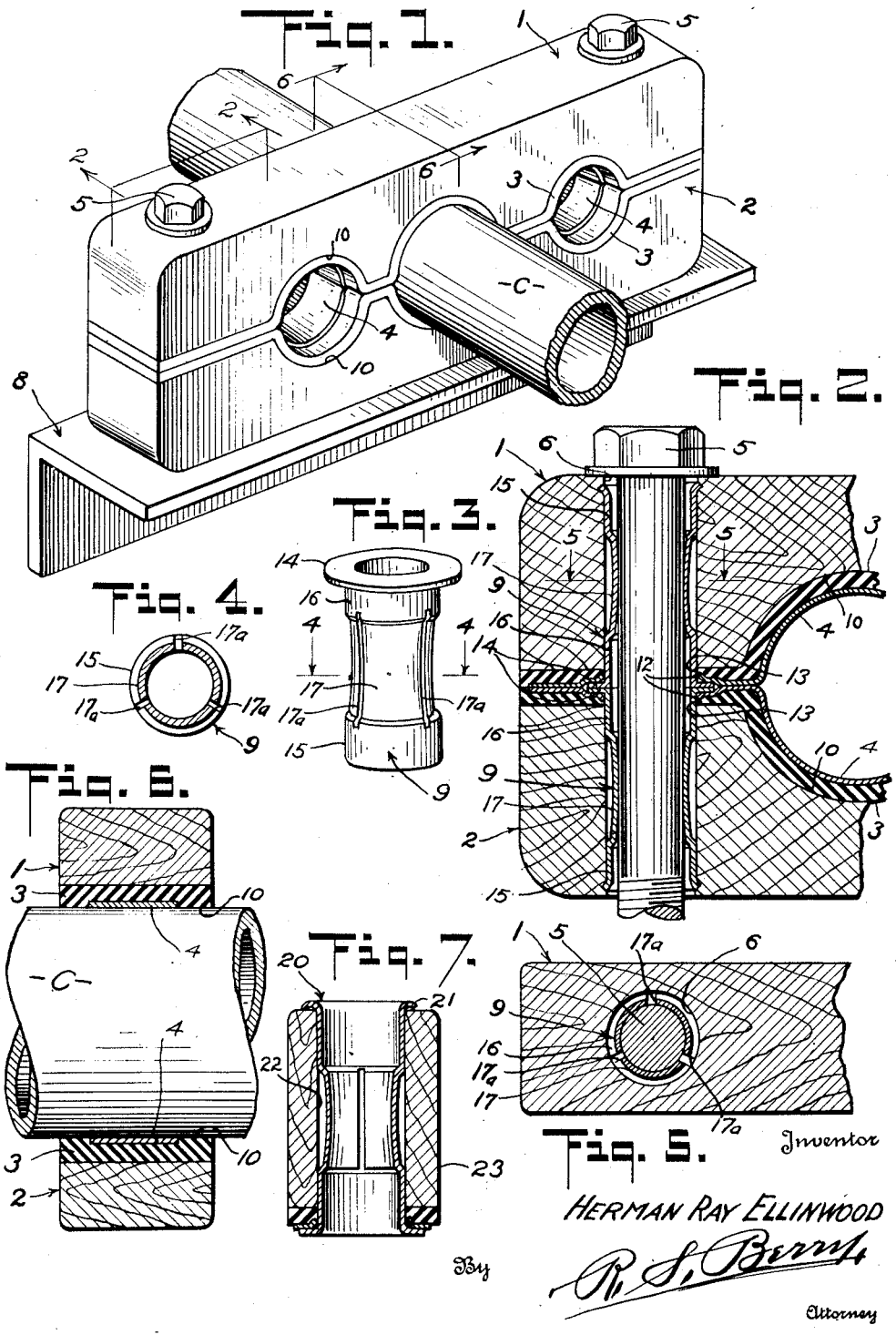
Inventor
HERMAN RAY ELLINWOOD
By R. S. Berry
Attorney Patented Nov. 7, 1944

2,362,124

UNITED STATES PATENT OFFICE 2,362,124

CONDUIT SUPPORT

Herman Ray Ellinwood, Burbank, Calif., assignor to Adel Precision Products Corp., a corporation of California Application August 18, 1942, Serial No. 455,193

8 Claims. (Cl. 174—135)

This invention relates to "blocks" for providing cushioned and electrical "grounded" supporting seats for a group of conduit lines in aircraft and the like.

Blocks of the type herein referred to form the subject matter of United States Letters Patent Number 2,227,528 granted January 7, 1941, to Paul W. Adler and United States Letters Patent Number 2,288,158 granted June 30, 1942, to Herman Ray Ellinwood.

One of the objects of the present invention is to provide a conduit supporting block which is constructed so as to conserve strategic materials in greater need for other military uses during the present war, the body of the block being constructed of wood, or plastics or similar material other than rubber or synthetic rubber and employing but small strips of rubber, synthetic or similar cushioning material as cushioned seats for the conduits. Moreover the use of wooden or like bodies makes it unnecessary in most instances to use metal backing strips heretofore employed also conserving this strategic material and reducing the number of parts compared to former blocks.

Another object of the present invention is to provide an improved "ground" connection or what is better known in this art as bonding means, for effecting and maintaining a better and more reliable electrical connection between the conduits in the block and the metal structure of the airplane.

A further object of this invention is to provide a block such as described wherein the improved bonding means facilitates the assembly of the unit and effectively secures the cushion strip and the bonding strip in place also makes it unnecessary to expose the bonding strip at the ends and other points on the block where it might become damaged, deranged or impaired by exposure to the atmosphere and other gases or liquids which may cause corrosive and electrolytic attack.

Another object is to provide a conduit supporting block wherein electrical connection between the bonding strip and the metal structure of the plane is made through a bolt employed to secure the block on the conduit as well as to said metal structure, there being as one embodiment of bonding means hereof a headed metal sleeve which is inserted through or past the bonding strip 4 the cushion strip into the body with its head in contact with said strip thereby holding said strip in place, while a part of the sleeve has a close fit with the body to frictionally hold the sleeve in place and another part of the sleeve has a close and tensioned contact with the bolt to insure a good "bonding" connection.

With the foregoing objects in view, together with such other objects and advantages as may subsequently appear, the invention resides in the parts and in the combination, construction and arrangement of parts hereinafter described and claimed, and illustrated by way of example in the accompanying drawing in which:

Fig. 1 is a perspective view of a block embodying the present invention:

Fig. 2 is a fragmentary enlarged sectional view taken on the line 2—2 of Fig. 1:

Fig. 3 is a perspective view of one of the sleeves:

Fig. 4 is a cross section taken on the line 4—4 of Fig. 3:

Fig. 5 is a fragmentary cross sectional view taken on the line 5—5 of Fig. 2:

Fig. 6 is an enlarged sectional view taken on the line 6—6 of Fig. 1:

Fig. 7 is a vertical sectional view taken through one half part of the block and a modified form of the sleeve.

Referring to the drawing more specifically it is seen that one embodiment of my invention generally includes a substantially rectangular and longitudinally divided block made of like conduit embracing sections 1 and 2, cushion members 3 in the form of strips of cushioning and insulation material such as synthetic rubber or other like compressible and elastic material, lining the opposed faces of the sections of the block; metallic bonding strips 4 overlying the cushion strips, bolts 5 inserted through holes 6 in the section of the block, nuts (not shown) are employed for holding the bolts on the metallic structural part of an airplane or the like indicated at 8 in Fig. 1, and metal sleeves 9 in said holes for establishing electrical connections between the bonding strips and the bolts.

The opposed faces of the sections 1 and 2 of the block are transversely channelled or grooved as at 10, said grooves or channels being semicircular and forming circular conduit receiving openings extending through the block whereby the conduits C are clamped in vibration-absorbing and insulated seats in contact with the bonding strips so that static electricity generated in the conduits will be discharged through the bonding strips, sleeves 9 and bolts 5 into the metal structure 8 of the airplane to prevent dangerous sparks and interference with the radio equipment of the airplane.

The block, that is the sections 1 and 2 making up the body of the block are made of wood or plastic or similar comparatively inelastic material which is comparatively rigid and form retaining the idea being to conserve rubber and synthetic rubber by using only the thin cushion strip of synthetic rubber or the like, as linings for opposed faces of the sections of the block. This will afford an effective cushioning and vibration absorbing seat also electrically insulate the conduit without requiring that the body portion, that is, the sections 1 and 2, be made entirely of synthetic rubber as heretofore in this art. Moreover the relatively greater rigidity of the wood or plastic block makes it unnecessary to use metal backing members heretofore used, except in very large blocks, thereby conserving metal and reducing the number of parts compared to former blocks. It should be noted that with certain semi-hard plastic material forming the block the cushion may be eliminated inasmuch as such material will have at least a certain amount of cushioning action and in all cases will serve as electrical insulation for the conduits.

The cushion strips 3 as here shown are at least equal in width and length to that of the opposed faces of the sections of the block and are cemented or glued to said faces so as to follow the contour thereof. However narrower and shorter strips or strip conformed to the channels could be used. The bonding strips 4 are narrower than the cushion strips and shorter so that the ends and longitudinal edges of the strips may be sealed between the cushion strips as shown in Fig. 2 to protect said bonding strips against derangement or corrosive or electrolytic attack.

The metal sleeves 9 are inserted through opening 12 in the end portions of the bonding strips and similar opening 13 in the end portions of the cushion strips as shown in Fig. 2. The annular flanges or head 14 on the sleeves engage the bonding strips while the end portions 15 and 16 of bodies of the sleeves have a close fit in the holes 6 in the sections of the block. The portions 17 of the sleeves located between the ends portions 15 and 16 are reduced and do not contact the walls of the holes 6, said reduced portions having longitudinal slits 17a whereby the portion 17 will have a close and tensioned contact with the bolts 5. Thus it is seen the end portions 15 and 16 frictionally hold the sleeves in the holes 6 while the longer tongue-like portions 17 closely contact the bolts to insure a good electrical bond between the sleeves and the bolts. The bolts have a loose fit with respect to the end portions 15 and 16 yet the latter will hold the sleeves against dislodgement when the bolts come into tight frictional engagement with the reduced intermediate portions 17.

As here provided the heads 14 of the opposed sleeves abut another and lie between the sections 1 and 2 of the block thereby being forced into and held in good contact with the bonding strips and one another and providing a good bond between the two block sections when the bolts are tightened to secure the blocks together and to the metal supporting structure. Moreover the sleeves 9 in abutting one another as aforementioned when the two sections are brought together prevent the bolts while being inserted from dislodging the sleeves.

As shown in Fig. 7 a modified form of sleeve 20 is identical with the sleeves 9 except that it is longer and the outer end is riveted over as at 21 to secure the sleeve in the opening 22 in the block section 23.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a conduit support, a retaining block of rigid form and non-elastic material divided into opposed sections adapted to clamp a conduit therebetween, elastic compressible cushioning members on opposed surfaces of said sections to provide a cushioned seat for the conduit, said sections having bolt holes therein, a metallic bonding strip lying between said cushioning members, a headed metal sleeve inserted past said bonding strip and one of said cushioning members with its head in contact with said bonding strip and its body disposed in a bolt hole in one of said sections, and a bolt extending through said bolt hole and said sleeve in close electrical contact with said sleeve and adapted to be secured to a metallic support so that the conduit will be bonded thereto through the bonding strip, the sleeve and the bolt.

2. In a conduit support, a retaining block of rigid form and non-elastic material divided into opposed sections adapted to clamp a conduit therebetween, elastic compressible cushioning members on opposed surfaces of said sections to provide a cushioned seat for the conduit, means for clamping said sections together, and securing the block to a metallic support including a metallic fastening passing through said sections, a bonding strip lying between said cushioning members and disposed for contact with said conduit and having an opening in a part thereof lying between the cushioning members, a metallic sleeve having an outwardly directed flange portion, said sleeve being inserted through said opening with said flange portion thereof, in contact with said bonding strip, said fastening passing through said sleeve in close electrical contact therewith.

3. In a conduit support, a sectional block adapted to clamp a conduit between sections thereof and having bolt holes in said sections, a metallic bonding strip disposed between one section and the conduit in contact with the conduit and extending to one side of the conduit between opposed faces of said sections, a metal sleeve extending into the bolt hole in said one section and having an end portion provided with an outwardly directed circumferential flange overlying and clamping the extended part of the bonding strip in place between said opposed faces, and a bolt passing through said holes and said sleeve in close contact with the sleeve and for holding said sections clamped upon the conduit and the block upon a metallic structure so that the conduit is bonded to said structure through the strip sleeve and bolt.

4. In a conduit support, a sectional block adapted to clamp a conduit between sections thereof and having bolt holes in said sections, a metallic bonding strip disposed between one section and the conduit in contact with the conduit and extending to one side of the conduit between opposed faces of said sections, a metal sleeve extending into the bolt hole in said one section and having an end portion provided with an outwardly directed circumferential flange overlying and clamping the extended part of the bonding strip in place between said opposed faces, and a bolt passing through said holes and said sleeve in close contact with the sleeve and for holding said sections clamped upon the conduit and the block upon a metallic structure so that the conduit is bonded to said structure through the strip sleeve and bolt, said sleeve having a portion of smaller diameter than said holes for closely contacting the bolt and another portion in close fit with said bolt holes and of said larger diameter than the bolt will pass loosely therethrough.

5. In a conduit support, a sectional block adapted to clamp a conduit between sections thereof and having bolt holes in said sections, a metallic bonding strip disposed between one section and the conduit in contact with the conduit and extending to one side of the conduit between opposed faces of said sections, a metal sleeve extending into the bolt hole in said one section and having an end portion provided with an outwardly directed circumferential flange overlying and clamping the extended part of the bonding strip in place between said opposed faces, and a bolt passing through said holes and said sleeve in close contact with the sleeve and for holding said sections clamped upon the conduit and the block upon a metallic structure so that the conduit is bonded to said structure through the strip sleeve and bolt, said sleeve having a reduced portion between its ends of such diameter as to tightly fit the bolt and loosely fit the bolt hole and being provided adjacent its end with portions of such diameter as to tightly fit the bolt holes and loosely fit the bolt.

6. In a conduit support, a sectional block adapted to clamp a conduit between sections thereof and having bolt holes in said sections, a metallic bonding strip disposed between one section and the conduit in contact with the conduit and extending to one side of the conduit between opposed faces of said sections, a metal sleeve extending into the bolt hole in said one section and having an end portion around which the metal of the sleeve is outbent forming a flange overlying and clamping the extended part of the bonding strip in place between said opposed faces, and a bolt passing through said holes and said sleeve in close contact with the sleeve and for holding said sections clamped upon the conduit and the block upon a metallic structure so that the conduit is bonded to said structure through the strip sleeve and bolt, said sleeve having a reduced portion between its ends of such diameter as to tightly fit the bolt and loosely fit the bolt hole and being provided adjacent its end with portions of such diameter as to tightly fit the bolt holes and loosely fit the bolt, said reduced portion having longitudinal slots therein to provide for a tensioned contact thereof with the bolt.

7. In a conduit support, a retaining block of rigid form and non-elastic material divided into opposed sections adapted to clamp a conduit therebetween, elastic compressible cushioning members on opposed surfaces of said sections to provide a cushioned seat for the conduit, said sections having bolt holes in them, a metallic bonding strip lying between said cushioning members, a metal sleeve inserted past said bonding strip and one of the said cushioning members, said sleeve having an outwardly directed flange in contact with said bonding strip, the body of said sleeve being disposed in a bolt hole in one of said sections, and a bolt extending through said bolt hole and sleeve in close electrical contact with said sleeve and adapted to be secured to a metallic support so that the conduit will be bonded thereto through the bonding strip, the sleeve and the bolt.

8. In a conduit support, a retaining block of rigid form and non-conducting material divided into opposed sections for clamping conduits between them, cushioning members on the opposed surfaces of said sections forming conduit seats, each of said sections having bolt holes which align with the other, a metallic bonding strip extending along the surface of each opposing face of said sections, a headed metal sleeve in each of said aligned bolt holes, the heads of said sleeves abutting against each other and being located in a contacting intervening relation to apertured portions of said bonding strips adjacent to said bolt holes, and bolts in said bolt holes passing through and in contact with said sleeves.

HERMAN RAY ELLINWOOD.